United States Patent [19]
Kobayashi et al.

[11] Patent Number: 5,892,146
[45] Date of Patent: Apr. 6, 1999

[54] HEATING RESISTOR TYPE AIR FLOW METER WITH A MEASURING MODULE INSIDE THE MAIN AIR FLOW PASSAGE BODY

[75] Inventors: Chihiro Kobayashi; Shinya Igarashi, both of Naka-machi; Akira Takasago, Hitachinaka, all of Japan

[73] Assignees: Hitachi, Ltd.; Hitachi Car Engineering Co., Ltd., both of Japan

[21] Appl. No.: 921,555

[22] Filed: Sep. 2, 1997

[30] Foreign Application Priority Data

Feb. 9, 1997 [JP] Japan .................................. 8-231620

[51] Int. Cl.⁶ ...................................................... G01F 1/68
[52] U.S. Cl. ...................... 73/118.2; 73/202.5; 73/204.15
[58] Field of Search ................................ 73/118.2, 202.5, 73/204.15, 204.21, 204.22

[56] References Cited

U.S. PATENT DOCUMENTS

| 4,911,008 | 3/1990 | Casey ...................................... 73/202.5 |
| 5,485,746 | 1/1996 | Mori et al. ............................. 73/204.22 |

FOREIGN PATENT DOCUMENTS

| 0 588 626 A2 | 3/1994 | European Pat. Off. . |
| 1-110220 | 4/1989 | Japan . |
| 2-1518 | 1/1990 | Japan . |
| 2 285 512 | 7/1995 | United Kingdom . |

Primary Examiner—Harshad Patel

[57] ABSTRACT

A highly accurate, low-cost and easy-to-handle heating resistor type flow meter has a main air flow passage body forming a main air flow passage for allowing air flowing therethrough. A measuring module has a heating resistor for measuring a flow rate of the air inserted inside the main air flow passage body: The measuring module comprises the heating resistor inside an auxiliary air flow passage body forming an L-shaped auxiliary air flow passage having an inlet opening portion opening in a direction perpendicular to a main flow line of the air and an outlet opening portion opening in a direction parallel to the main flow line. The main air flow passage body comprises an orifice on a periphery of the inner side wall positioned in an upstream side of the air flow passage body. Both of the inlet opening portion and the outlet opening portion are arranged within a flow flux zone formed by extending the air flow from a top edge of the orifice in a direction parallel to the main flow line.

6 Claims, 8 Drawing Sheets

HEATING RESISTOR TYPE AIR FLOW METER WITH A MEASURING MODULE INSIDE THE MAIN AIR FLOW PASSAGE BODY

BACKGROUND AND SUMMARY OF THE INVENTION

This application claims the priority of 8-231620, the disclosure of which is expressly incorporated by reference herein.

The present invention relates to an air flow meter for measuring an air flow rate, and more particularly to a heating resistor type air flow meter suitable for measuring an intake air flow rate of an internal combustion engine of a vehicle.

The conventional way of improving the measuring accuracy of a heating resistor type air flow meter used in an internal combustion engine under a pulsating flow condition, as disclosed in Japanese Patent Application Laid-Open No. 2-1518, provides a flow passage having an L-shaped detecting tube. That is, the flow passage comprises a wall against backward flow so that the back flow does not directly impinge on the heating resistor. Although such a flow passage construction cannot suppress back flow, it is possible to moderate a so-called binary-value phenomenon, that is, decrease of a detected value in the heating resistor type air flow meter which is caused when a pulsation amplitude of air flow increases.

Further, a flow passage construction having an orifice is disclosed in Japanese Patent Application Laid-Open No. 1-110220. In this construction, a heating resistor is arranged just downstream of an orifice inside a detecting tube which is a nearly straight and short tube parallel to the main flow direction.

In the prior art described above, it is impossible to measure flow speed by identifying direction of the flow. Therefore, when averaged output signals of the heating resistor type air flow meter are plotted as the boost pressure is being varied by gradually opening the throttle valve while rotating speed of the engine is kept constant, the averaged output signal gradually increases, but shows a jump-up phenomenon at boost pressures above a certain point indicating a plus side measuring error to an actual flow speed (flow rate), as shown in FIG. 12(b). The phenomenon is caused by the amplitude of pulsation of the heating resistor type air flow meter gradually increasing as opening degree of the throttle valve is increased and finally back flow occurs at opening degrees of the throttle valve above a point B, as shown in FIG. 12(b). The heating resistor type air flow meter cannot identify flow direction. Therefore, when back flow occurs, the averaged output increases because flow speed is equally detected independently of forward flow and back flow. It is known that this phenomenon often occurs particularly in an engine having four or less cylinders at a comparatively low rotating speed range of 1000 to 2000 rpm, and hardly occurs in an engine having more than four cylinders.

It is possible to reduce the error caused by back flow by employing one of the prior art teachings described above in which a wall against backward flow is provided in the flow passage so that the back flow does not directly impinge on the heating resistor. However, the error can be reduced by only a half. This is because when back flow occurs, forward flow increases by an amount of the back flow at the same time.

Further, it is difficult to prevent the back flow in an intake flow passage from occurring because of structures of the engine and the intake flow passage. Accordingly, in order to reduce the error caused by back flow, it is necessary to employ a complex method such as a structure in which an amount of back flow rate is subtracted from an amount of forward flow rate or a structure in which both of a forward flow rate and a back flow rate are separately measured.

An object of the present invention is to provide a low-cost and easy-to-handle heating resistor type flow meter by improving the measuring accuracy, including deviation accuracy, under pulsating flow accompanying back flow when the heating resistor type flow meter is mounted on a vehicle.

A heating resistor type flow meter to attain the above object comprises a main air flow passage body forming a main air flow passage for allowing a fluid to be measured flowing therethrough; and a measuring module having a heating resistor for measuring a flow rate of the fluid to be measured, inserted inside the main air flow passage body, wherein the measuring module comprises the heating resistor inside an auxiliary shaped auxiliary air flow passage body forming an L-shaped auxiliary air flow passage having an inlet opening portion opening in a direction perpendicular to a main flow line of the fluid to be measured and an outlet opening an portion opening in a direction parallel to the main flow line;

the main air flow passage body comprises an orifice on a periphery of the inner side wall positioned in an upstream side of the air flow passage body; and both of the inlet opening portion and the outlet opening portion are arranged within a flow flux zone formed by extending the fluid to be measured from a top edge of orifice in a direction parallel to the main flow line.

According to the present invention, because increase of flow speed within the flow flux zone formed by the orifice reduces an effect of back flow flowing in the auxiliary air flow passage body having the both opening portions arranged within the flow flux zone, the measuring accuracy can be improved.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE PREFERRED EMBODIMENTS

Figure 1:
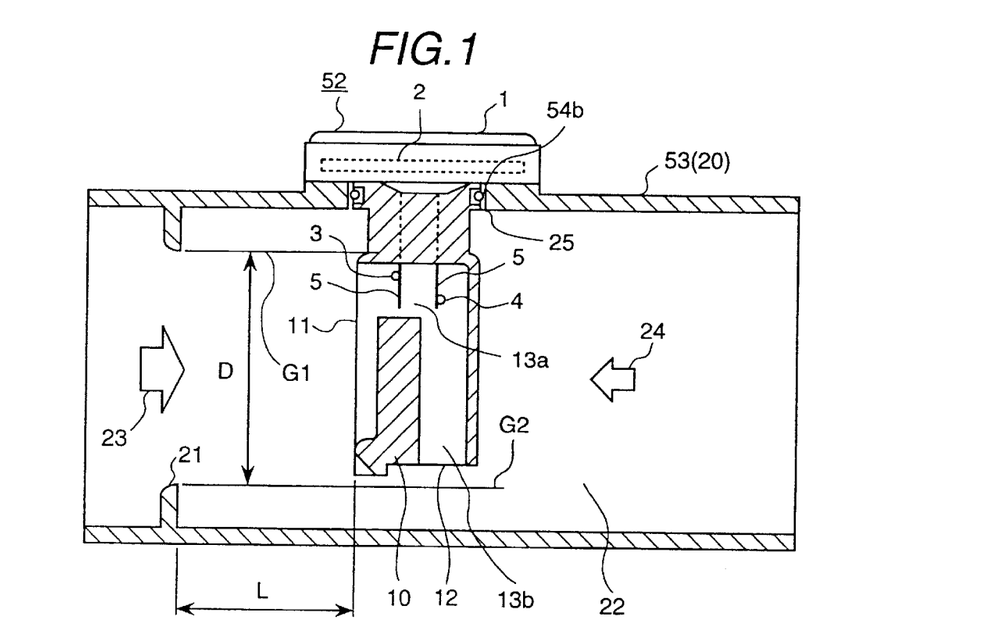
FIG. 1 is a cross-sectional front view showing an embodiment of a heating resistor type air flow meter in accordance with the present invention.

The heating resistor type air flow meter (hereinafter referred to as "flow meter") comprises a measuring module 52 for measuring flow rate, a body 53, that is, a main air flow passage body 20, and parts for attaching the body 53 to the measuring module 52 such as screws 54a, a seal 54b and so on which form a main air flow passage 22.

A hole 25 is bored on a wall of the main air flow passage body 20 of the body 53 forming the main air flow passage 22, and the measuring module 52 of an auxiliary air flow passage body 10 is inserted through the hole 25 and fixed to the main air flow passage body 20 using the screws 54a so as to maintain mechanical strength between a mounting surface of the main air flow passage 20 and a mounting surface of a housing 1. The seal 54b is attached between the measuring module 52 and the body 53 of the main air flow passage body 20 to keep air-tightness.

The measuring module 52 is mainly composed of the housing 1 containing a circuit board 2 for mounting a drive circuit to be described later and the auxiliary air flow passage body 10 made of a non-conductive material. In the auxiliary air flow passage body 10, a heating resistor 3 for detecting an air flow rate and a temperature-sensing resistor 4 for compensating intake air temperature are arranged so as to be electrically connected to the circuit board 2 through a support body 5 made of a conductive material. That is, the housing 1, the circuit board 2, the heating resistor 3, the temperature-sensing resistor 4, the auxiliary air flow passage 10 and so on are integrated in a unit as the measuring module 52.

Figure 3:
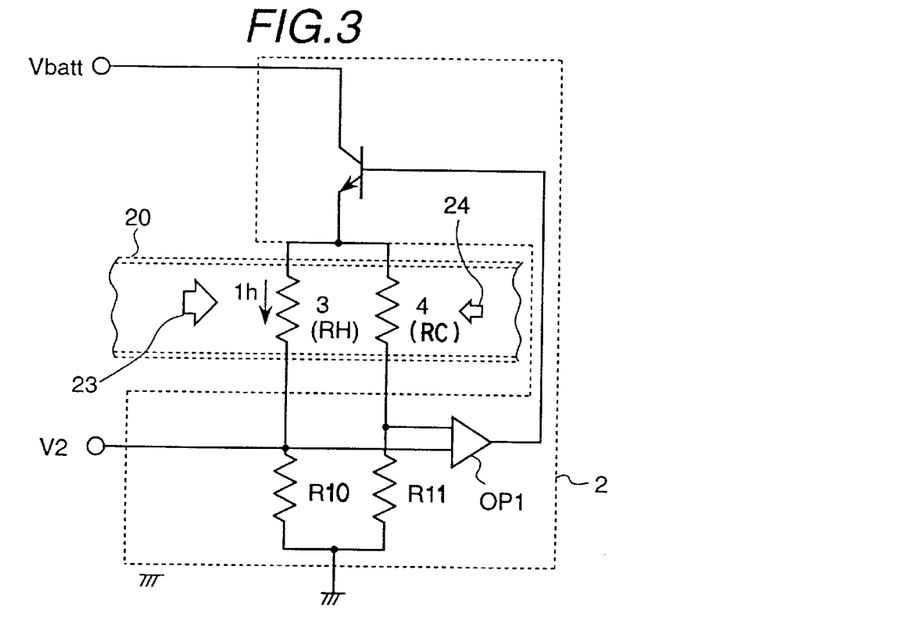
FIG. 3 is a circuit diagram showing the construction of the heating resistor type air flow meter of FIG. 1.

In regard to the operational principle of flow measurement in the above-mentioned flow meter, the construction of circuit will be described first. FIG. 3 is a circuit diagram showing the construction of the heating resistor type air flow meter of FIG. 1. The drive circuit formed on the circuit board 2 of the flow meter is composed of roughly a bridge circuit and a feedback circuit. The bridge circuit is constructed by the heating resistor 3 (RH) for measuring an intake air flow rate, the temperature-sensing resistor 4 (RC) for compensating intake air temperature and resistors R10 and R11, and heating current Ih is conducted to the heating resistor RH being controlled by feedback using an operation amplifier OP1 so as to keep a constant temperature difference between the heating resistor RH and the temperature-sensing resistor RC to output an output signal V2 corresponding to an air flow rate. When the air flow speed is fast, the heating current Ih is increased since an amount of heat dissipated from the heating resistor RH is large. On the other hand, when the air flow speed is slow, the heating current may be small since an amount of heat dissipated from the heating resistor RH is small. Therein, since the amount of heat dissipated from the heating resistor RH is independent of the direction of air flow, that is, forward flow or back flow, the heating current Ih flows even when air flows backward and as a result the jump-up phenomenon of the flow meter occurs.

The auxiliary air flow passage body 10 of a "passage structure forming an L-shaped detecting tube" forms a nearly L-shaped auxiliary air flow passage 13. That is, the passage 13 comprises a longitudinal passage 13a and a lateral passage 13b which is composed of an auxiliary air passage inlet port 11 opening in a direction perpendicular to a main flow line of the forward direction 23 of air flow; the longitudinal passage 13a extending parallel to the main flow line from the auxiliary air passage inlet port 11; the lateral passage 13b communicating with the longitudinal passage 13a and bending nearly at right angle, and extending perpendicular to the main flow line; and an auxiliary air passage outlet port 12 positioned at the rear end of the longitudinal passage 13a and opening parallel to the main flow line. In general, the heating resistors such as the heating resistor 3 and the temperature-sensing resistor 4 are arranged on inner portion of the longitudinal passage 13a.

On the other hand, the main air flow passage body 20 of the body 53 comprises an orifice 21 formed on a periphery of the inner side wall the main air flow passage body 20, positioned in an upstream side of the inserted air flow passage body 10; and the both opening portions (surfaces), the auxiliary air passage inlet port 11 of the inlet opening portion (surface) of the auxiliary air flow passage body 10 and the auxiliary air passage outlet port 12 of the outlet opening portion (surface), are arranged within a flow flux zone D formed by extending air flow 23 in the forward direction of the fluid to be measured from a top edge of the orifice 21 in a direction parallel to the main flow line. As shown in FIG. 1, the inside of the zone surrounded by the flow lines G1, G2 extends in the direction parallel to the main flow line from the top edge of the orifice 21. For instance, the flow flux zone corresponding to a cylinder having an inner diameter D, when the main air flow passage body 20 is cylindrical as shown in FIG. 2.

Figure 2:
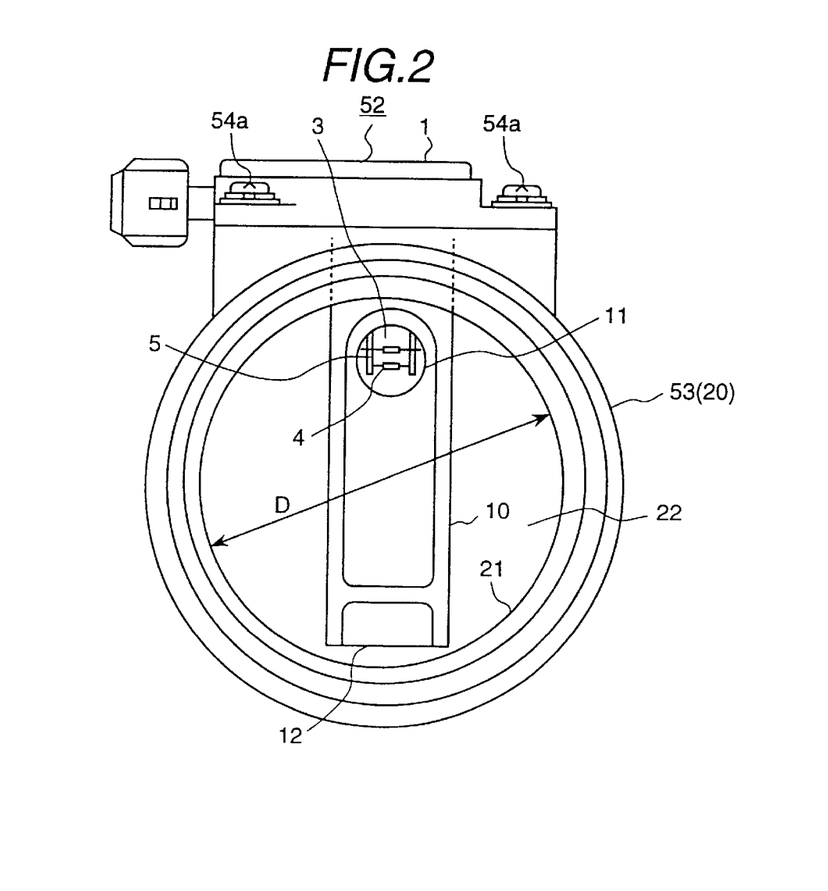
FIG. 2 is a side view showing the heating resistor type air flow meter of FIG. 1 seen from the upstream side.

That is, as shown in FIG. 2, the shape of the main air flow passage body 20 to be inserted with the auxiliary air flow passage body 10 is nearly cylindrical (circular-tube-shaped), and an effective cross-sectional area defined by the flow flux of the air flow of the fluid to be measured flowing through the main air flow passage 22 formed by the main air flow passage body 10 includes configurational positions of the inlet and outlet opening portions (the auxiliary air flow passage inlet port 11 and the auxiliary air flow passage outlet port 12) of the auxiliary air flow passage body 10.

In other words, the orifice 21 is provided in the periphery of the inner side wall of the main air flow passage body 20, positioned in an upstream side of the inserted air flow passage body 10. The cross-sectional shape of the orifice 21 is a venturi-shape having its center axis nearly equal to that of the main air flow passage 22, an upstream side of the orifice 21 is nearly arc-shaped and a direction of a wall surface of the orifice 21 in the downstream side is nearly normal to the direction of the forward air flow 23. Further, in regard to the configuration of the orifice and the inlet and outlet ports of the auxiliary air flow passage inlet port 11 and the auxiliary air flow passage outlet port 12 of the auxiliary air flow passage body 10, both of the auxiliary air flow passage inlet port 11 and the auxiliary air flow passage outlet port 12 are arranged in the inner side of the orifice diameter D (the flow flux zone D in the figure) when seen from the upstream side, as shown in FIG. 2. It is preferable that the auxiliary air flow passage inlet port 11 is arranged at a position in the wall side of the passage and near the inner side of the flow line G1 shown in FIG. 1 and the auxiliary air flow passage outlet port 12 is arranged at a position in the wall side of the passage and near the inner side of the flow line G2 shown in FIG. 1.

The reason why the upstream side half of the orifice 21 is formed arc-shaped (bell-mouth shaped) is that the air flow near the center of the flow passage downstream of the orifice 21 is prevented from being disturbed, and the reason why the direction of the wall surface in the downstream side half is formed nearly normal to the direction of the main flow line is that the forward air flow 23 downstream of the orifice 21 is easily flow separated. By doing so, it is possible to increase flow speed of forward flow under pulsating flow condition downstream and inside the diameter of the orifice 21 without disturbing the flow.

The heating resistor type flow meter in accordance with the present invention comprises a main air flow passage body forming a main air flow passage for allowing a fluid to be measured flowing therethrough; and a measuring module having a heating resistor for measuring a flow rate of the fluid to be measured, inserted inside the main air flow passage body, wherein the measuring module comprises the heating resistor inside an auxiliary air flow passage body forming an L-shaped auxiliary air flow passage having an inlet opening portion opening in a direction perpendicular to a main flow line of the fluid to be measured and an outlet opening portion opening in a direction parallel to the main flow line; the main air flow passage body comprises an orifice on a periphery of the inner side wall positioned in an upstream side of the air flow passage body; and both the inlet opening portion and the outlet opening portion are arranged within a flow flux zone formed by extending the fluid to be measured from a top edge of the orifice in a direction parallel to the main flow line.

Description will be made below the mechanism for reducing the jump-up error and the binary-value phenomenon caused by the effect of back flow by providing the orifice in the upstream side of the L-shaped auxiliary air flow passage body which is a characteristic of the present invention. Initially, comparison of effects of presence and absence of the orifice will be described, referring to FIGS. 4A, 4B, 5A, 5B.

Figure 4A:
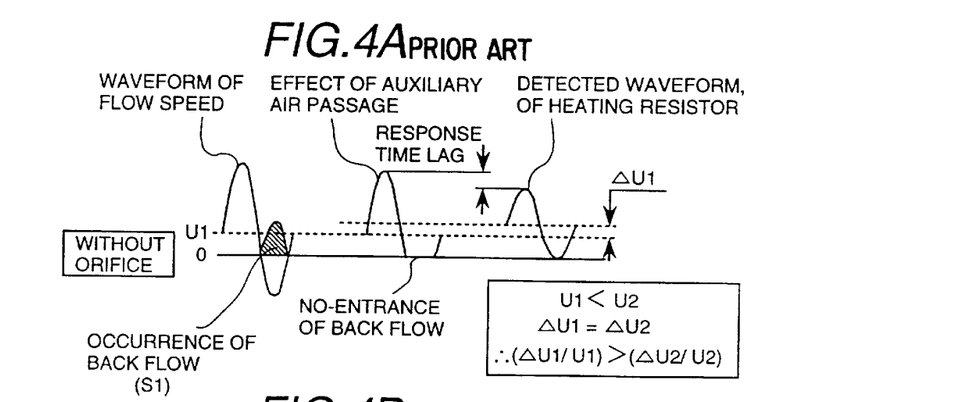
FIGS. 4(A) and 4(B) are diagrams showing the mechanism for reducing a jump-up error by an orifice in accordance with the present invention.
Figure 4B:
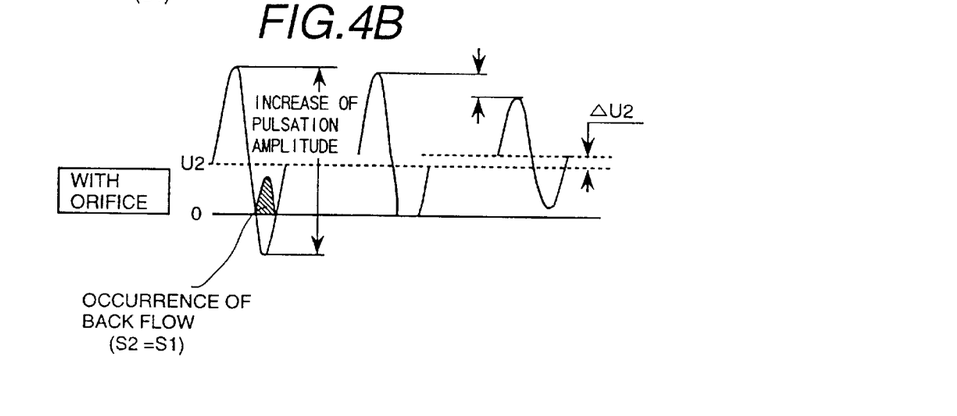

FIG. 4A and 4B show waveforms for cases without orifice and with orifice, respectively. In a case of a conventional flow meter without orifice, when back flow occurs in the main air flow passage as shown by the waveform of FIG. 4A, the waveform of an actually detected signal becomes a waveform folded at a line nearly zero flow speed as shown by the hatched lines since the flow direction cannot be detected solely by the heating resistor. Further, by employing the L-shaped auxiliary air flow passage described above, it is possible to prevent back flow from entering into the auxiliary air flow passage as shown by the waveform of effect of auxiliary air flow passage of FIG. 4A.

Furthermore, when an amplitude of flow speed is large enough to cause back flow at an average flow speed of U1 in the case without orifice, it is possible to prevent back flow from entering into the auxiliary air flow passage by the effect of auxiliary air flow passage. However, an average value of a waveform, taking response time lag of the heating resistor into consideration, is increased by $\Delta U1$ since an amount corresponding to back flow is not subtracted from the average value and accordingly the forward flow is increased by the corresponding amount. The value $\Delta U1$ is a detected error due to back flow.

On the other hand, in a case of arranging an orifice in the upstream side of the L-shaped auxiliary air flow passage, since flow separation eddies are generated in the downstream side of the orifice, the effective crosssectional area of the main air flow passage is narrowed, the average flow speed U2 becomes faster than U1 and the pulsating amplitude is also increased in the portion in which the auxiliary air flow passage is arranged. However, since as to the back flow there is no means for reducing effective cross-sectional area in the portion of the auxiliary air flow passage, that is, the orifice in the upstream side of the auxiliary air flow passage is not related to the back flow, the values $\Delta U1$ and $\Delta U2$ as the effect of back flow (flow rate of back flow) become nearly equal. That is, it is possible to increase the average flow speed solely without changing back flow rate by arranging the orifice in the upstream side of the auxiliary air flow passage.

Therefore, from the above relations, that is, U1<U2, $\Delta U1 = \Delta U2$, the relation $(\Delta U1/U1) > (\Delta U2/U2)$ is satisfied, and accordingly the measuring error (jump-up error) of the flow meter due to back flow in the case of providing the orifice in the upstream side of the auxiliary air flow passage can be reduced compared to the measuring error in the case without the orifice.

Figure 13:
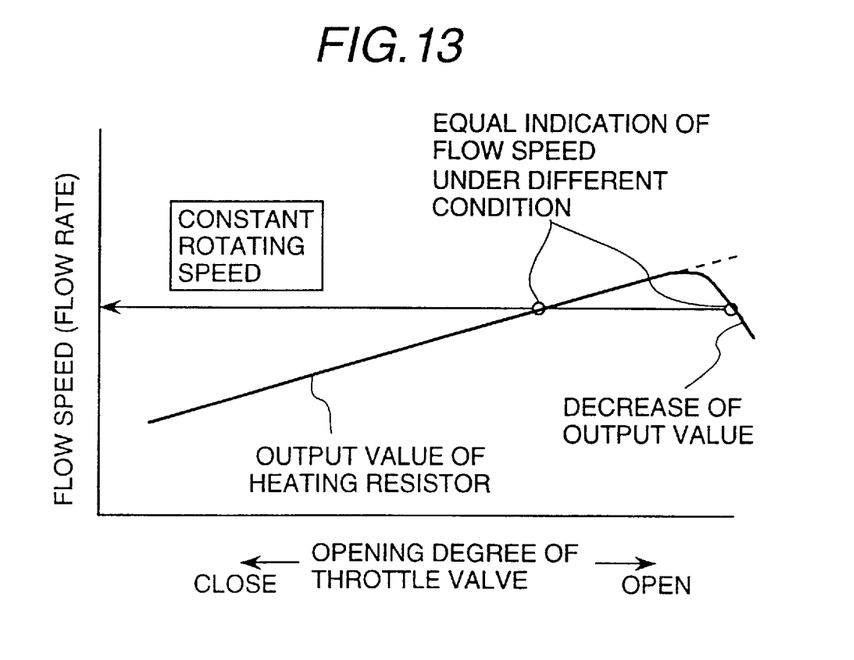
FIG. 13 is a diagram explaining a binary-value phenomenon of a flow meter under pulsating flow.

On the other hand, provision of the orifice in the upstream side of the auxiliary air flow passage has another effect that it is possible to moderate a so-called binary-value phenomenon, that is, decrease of a detected value in the flow meter which is caused when a pulsation amplitude of air flow increases and even without occurrence of back flow. As shown in FIG. 13, the binary-value phenomenon is a decrease in output signal which is caused when intake back pressure is varied by gradually opening a throttle valve while the rotating speed of an engine is kept constant. The reason why this phenomenon is caused is that the output characteristic of the heating resistor in regard to air flow rate (flow speed) has a non-linear relation.

When such a phenomenon occurs, a control system of an engine cannot perform an accurate fuel control because there are two different operating conditions to an equal indication value of flow rate. As having been described above in connection with the prior art, this phenomenon can be avoided to a certain degree by arranging a heating resistor inside an L-shaped auxiliary air flow passage having a bent portion without orifice. However, in order to moderate the binary-value phenomenon for all kinds of engines, it is necessary to optimize the shape of the auxiliary air flow passage for each kind of engine. On the other hand, the orifice in the upstream side of the auxiliary air flow passage provided in the heating resistor type air flow meter in accordance with the present invention is effective for moderating the binary-value phenomenon for all kinds of engines. The binary-value phenomenon will be described below, referring to FIGS. 5A and 5B showing flow velocity distributions for cases without orifice and with orifice, respectively.

Figure 5A:
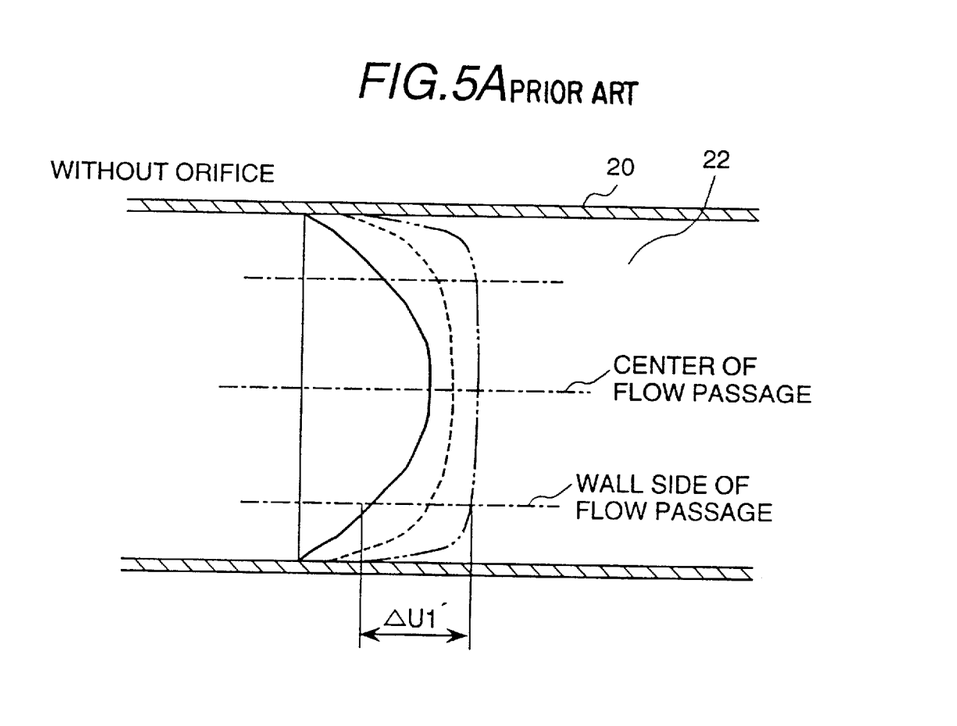
FIGS. 5A and 5D are views of air flow distribution in ducts without and with orifices, respectively, and showing the mechanism for reducing a binary-value phenomenon by an orifice in accordance with the present invention.
Figure 5B:
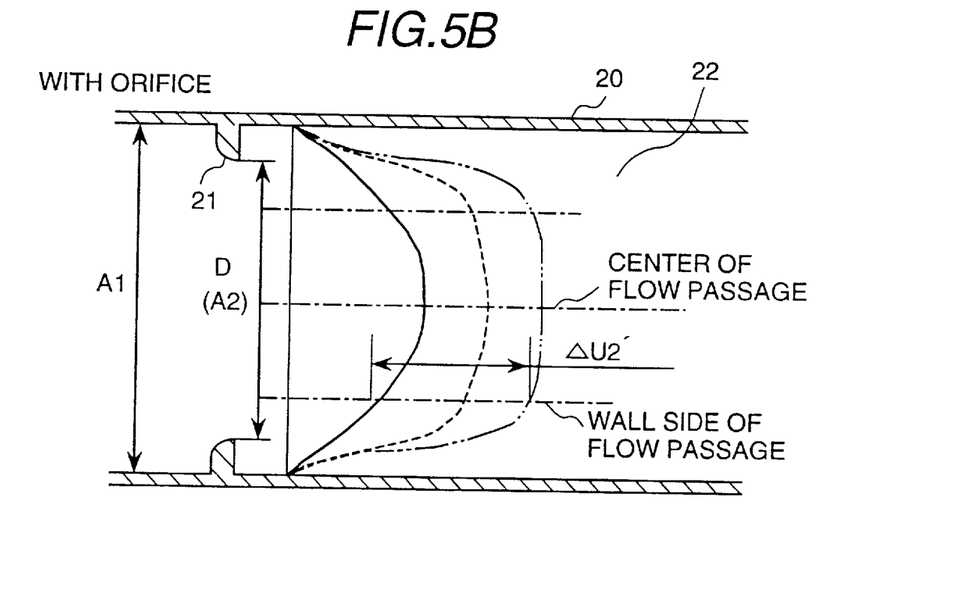

As shown in FIGS. 5A and 5B, a flow distribution of air flow in a duct generally shows a parabolic distribution in a steady state condition. However, under a pulsating flow condition, the distribution profile changes from the parabolic flow velocity distribution to a flat velocity distribution as the amplitude of flow speed is gradually increased. With comparing the flow velocity distribution by presence and absence of the orifice, the distribution in the case without orifice is seen in FIG. 5A and the distribution in the case with orifice is seen in FIG. 5B.

Referring to FIG. 5B, when the orifice 21 exists, air is difficult to flow in the vicinity of the wall surface of the main air flow passage 22 since the vicinity of the wall is shadowed by the orifice 21. Thereby, speed of the air flow in the other portion, that is, in the downstream portion of the zone D (for example, cylindrical portion having an inner diameter of D) of the orifice 21 is extremely increased. Further, an increased amount of flow speed is larger in a position in the wall side of the passage apart from the center the passage of the inner diameter downstream portion of the orifice 21 shown in the figure than in the center of the passage. This is the reason why the auxiliary air flow passage inlet port 11 is arranged at a position in the wall side of the passage and near the inner side of the flow line G1 and the auxiliary air flow passage outlet port 12 is arranged at a position in the wall side of the passage and near the inner side of the flow line G2.

As described above, between the increased amount of flow speed $\Delta U1'$ at a position in the wall side of the passage shown in FIG. 5A and the increased amount of flow speed $\Delta U2'$ at a position in the wall side of the passage shown in FIG. 5B there is a relation $\Delta U1'<\Delta U2'$. Therefore, by appropriately arranging the inlet port and the outlet port of the auxiliary air flow passage in the downstream portion of the zone D, flow speed of air flowing in the auxiliary air flow passage is also increased as an amplitude of pulsation increases. Therefore, even if an output of the heating resistor is decreased due to the non-linearity, the increased amount of flow speed increasing the flow speed flowing in the auxiliary air flow passage compensates for the corresponding decreasing amount.

However, when the dimension (inner diameter D) of the orifice is reduced too much, the increased amount of flow speed becomes excessively large and consequently there occurs a phenomenon that the output of the heating resistor increases regardless of absence of occurrence of back flow. Therefore, in taking it into consideration a decrease in the effect of back flow and a reduction of the binary-value phenomenon, a ratio of the effective cross-sectional area A1 of the main air flow passage 20 to the effective cross-sectional area A2 of the orifice 21 (the effective crosssectional area of the zone D) should be set to an optimum value to be described below.

Since the effect of increasing flow speed described above is large at a position where flow speed is large, it is important that the inlet port and the outlet port of the auxiliary air flow passage are arranged in a downstream portion inside the zone D (for example, cylindrical portion having a diameter D) of the orifice 21. That is, it is necessary that the inlet port 11 of the auxiliary air flow passage opening nearly normal to the direction of the main flow line of the air flow should be arranged in such a configuration that kinetic pressure directly acts on the inlet port 11, and the outlet port 12 of the auxiliary air flow passage opening nearly parallel to the direction of the main flow line of the air flow should be arranged in such a configuration that sucking effect in the outlet port is increased by giving kinetic pressure in the upstream side of the outlet port and generating flow separation eddies.

Further, since the outlet port 12 of the auxiliary air flow passage opens nearly parallel to the direction of the main flow line of the air flow, it is required to suppress loss by collision of air flow with the wall surface of the main air flow passage body 20. Therefore, the outlet port 12 of the auxiliary air flow passage should be arranged appropriately apart from the wall surface.

Results of an experimental study on the above-mentioned orifice dimension using a actual vehicle will be described below, referring to FIG. 6 and FIG. 7.

Figure 12A:
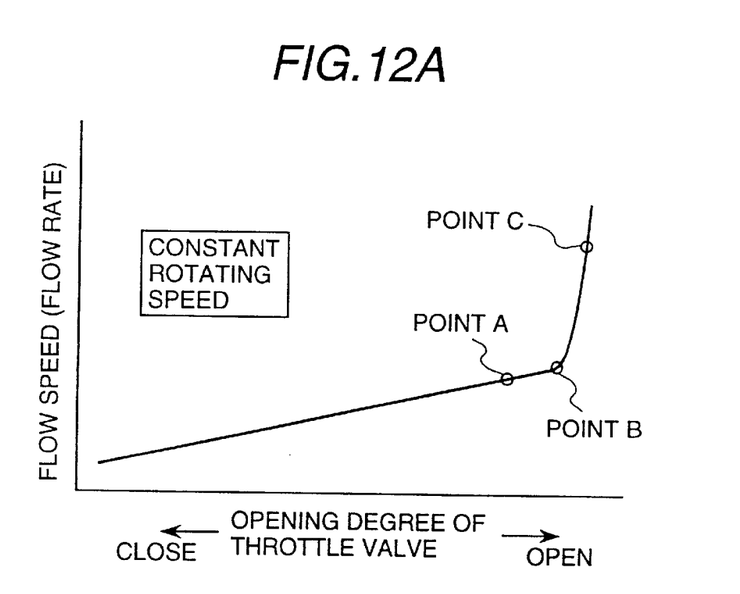
FIGS. 12A and 12B are diagrams explaining a jump-up error of a flow meter under pulsating flow.
Figure 12B:
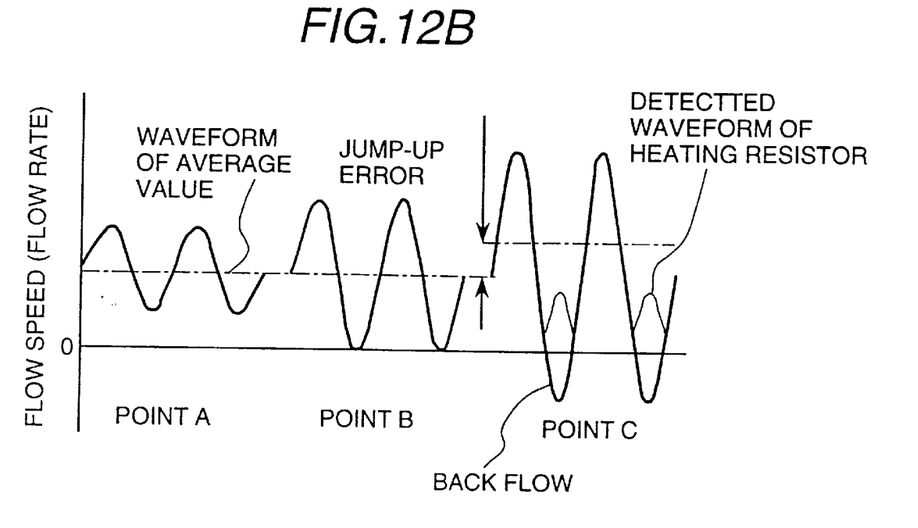

A test was conducted using an engine on a bench in the same procedure as in FIGS. 12A and 12B by gradually opening the throttle valve while keeping constant rotating speed of the engine, and an detected error indicating the heating resistor at full open state of the throttle valve was plotted with varying dimension (inner diameter D) of the orifice. From the test, in regard to dimension of the orifice as shown in FIG. 5B and FIG. 6, an effect of reducing the jump-up error due to back flow could be obtained in a range of the contraction ratio $R=(A2/A1)\geq 7\%$, where A1 is the effective cross-sectional area of the main air flow passage in which the auxiliary air flow passage was placed, and A2 is the effective cross-sectional area of the orifice having an inner diameter of D.

On the other hand, when the contraction ratio R was smaller than 70%, it was found that the output was caused to increase. The reason is that the detected flow speed itself increases downstream of the orifice when the amplitude of the pulsating flow increases, as described above. A test result at a rotating speed with back flow not occurring is also shown in the figure for purpose of reference. It was confirmed that the output rapidly increases with a contraction ratio $R<70\%$.

Therefore, it may be preferable that the ratio of the cross-sectional area A2 of the orifice to the cross-sectional area A1 of the main air flow passage in which the auxiliary air flow passage was placed satisfies the relation $R=(A2/A1)\geq 70\%$. However, in taking the case of the contraction ratio R of 100% (corresponding to the conventional technology) into consideration, it can be said that the range $90\%\geq R\geq 70\%$ is preferable. Particularly, in order to reduce the error to one-half, the range $80\%\geq R\geq 70\%$ is preferable. Further, it has been confirmed from the test result that the effect of reducing the jump-up error is good when $90\%\geq R\geq 70\%$ and a distance L from the orifice 21 to the inlet opening portion 11, shown in FIG. 1, is near a value satisfying the relation $L=0.7D$.

Description will be made below on the relationship between positional relationship of the orifice and the inlet and outlet ports of the auxiliary air flow passage and output noise of the flow meter under a steady state condition, referring to FIG. 7 in which the ordinate indicates value of output noise and the abscissa indicates contraction ratio R as in FIG. 6.

Dimension of a sample orifice used in this test had a contraction ratio R of nearly 60%. Therefore, a contraction ratio R smaller than 60% means that the both positions of the inlet port and outlet port of the auxiliary air flow passage are within a zone shadowed by the orifice 21 (a wall side zone outside a zone surrounded by the main flow lines G1 and G2 shown in FIG. 1).

Figure 7:
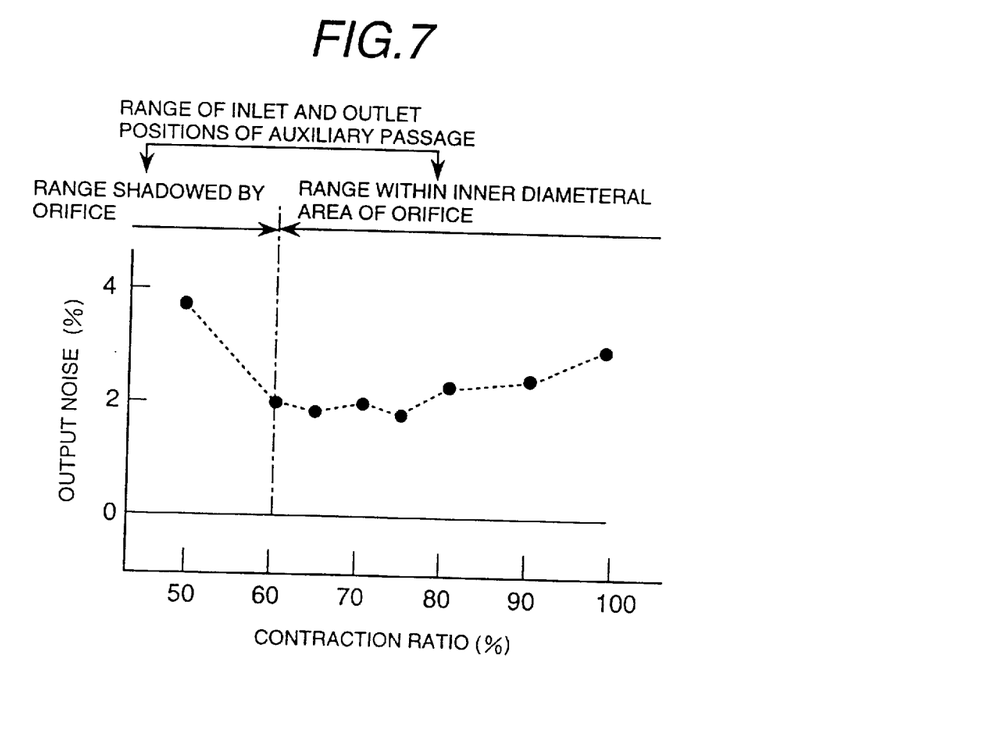
FIG. 7 is a graph showing the relationship between position of an orifice relative to inlet and outlet ports of an auxiliary air passage and output noise.

As shown in FIG. 7, within the range of the contraction ratio R of 100~60%, the output noise decreases as the contraction ratio R is decreased. However, in the range of the contraction ratio smaller than 60%, the output noise is clearly increased. That is, when the both positions of the inlet port and outlet port of the auxiliary air flow passage are within the zone D (the zone within the zone surrounded by the main flow lines G1 and G2 shown in FIG. 1), the output noise is small. It has been found that the output noise can be reduced basically by increasing the contraction ratio R, that is, by decreasing the dimension of the orifice to increase flow speed of the air. Further, it has been found that flow in the main air flow passage is disturbed and accordingly output noise is increased when then orifice exists upstream and flow separation occurs downstream, that is, the both positions of the inlet port and the outlet port of the auxiliary air flow passage are within the zone shadowed by the orifice 21.

From the above result, both the inlet port and the outlet port require that upstream flow is not disturbed since a value of flow speed in the auxiliary air flow passage is determined by a pressure difference between the inlet port and the outlet port. Therefore, in a case of an orifice or the like arranged in the upstream side of the auxiliary air flow passage, it is necessary to take the relative positions of the inlet port and the outlet port of the auxiliary air flow passage and the dimension of the orifice into consideration from viewpoint of output noise.

Figure 6:
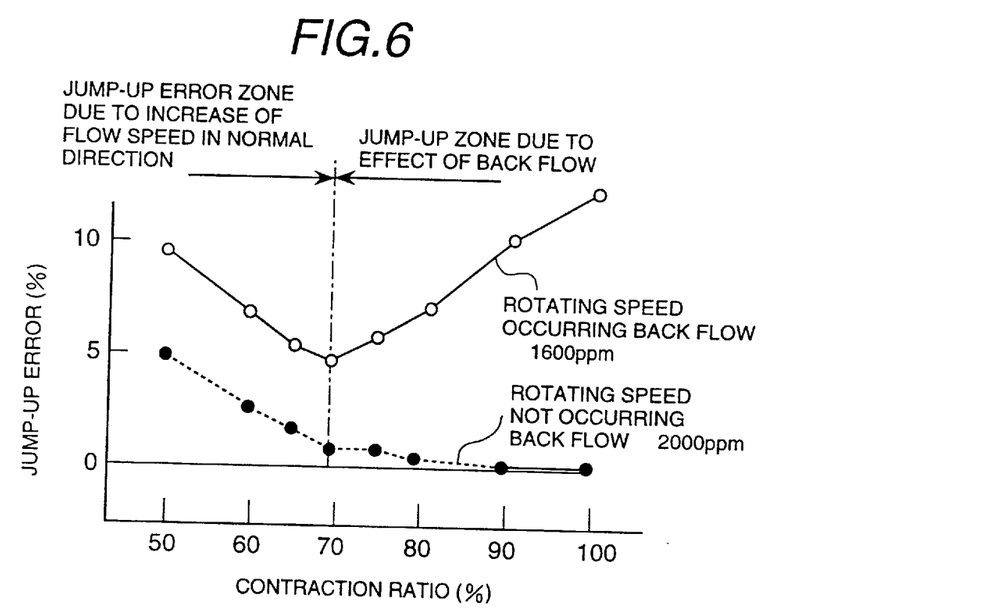
FIG. 6 is a graph showing the relationship between orifice dimension and jump-up error.

From the results of FIG. 6 and FIG. 7, in order to reduce the jump-up error and the output noise, it can be said that the range $90\% \geq R \geq 70\%$ is preferable.

Figure 8:
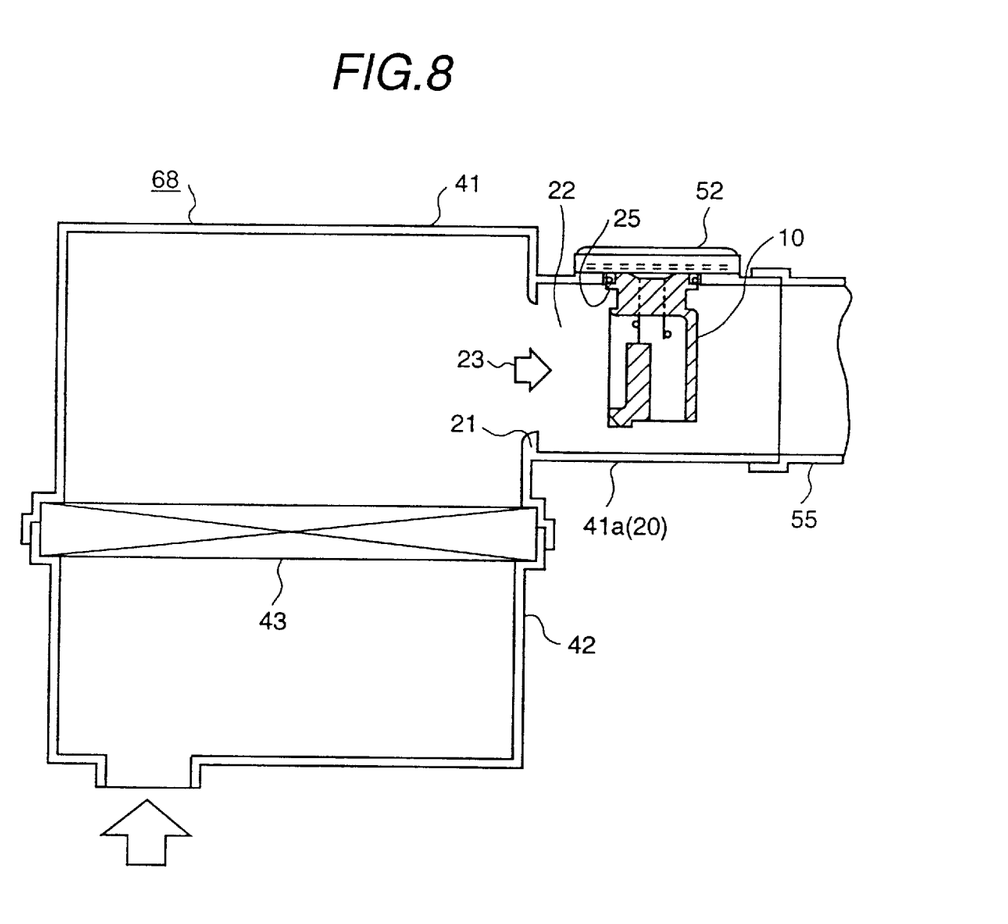
FIG. 8 is a cross-sectional view showing another embodiment of a heating resistor type air flow meter in accordance with the present invention.

FIG. 8 is a cross-sectional view showing another embodiment of a heating resistor type air flow meter in accordance with the present invention. The figure shows a cross-sectional side view of the flow meter in which a straight pipe 41a having an orifice forming a main air flow passage is integrated as a part of an air cleaner clean side 41 of an air cleaner 68. The air cleaner 68 of one of intake pipe structural members composing the intake system is composed of the air cleaner clean side 41 integrating the straight pipe 41a having the orifice of the main air flow passage body 20 as a unit and an air cleaner dirty side 42 and an air filter element 43.

In this embodiment, the orifice 21 is provided in an intake air outlet portion of the air cleaner clean side 41 (a duct placed in the downstream side of the air filter 43), and the straight pipe 41a as the flow meter is integrally connected downstream of the orifice, and the measuring module 52 of the auxiliary air flow passage 10 shown in FIG. 1 is inserted into a hole 25 provided on a wall surface of the straight pipe 41a having the orifice. In this embodiment, since the air cleaner 68 of an existing intake pipe structural member serves as the main air flow passage body 20 having the orifice 21 and the hole 25, a dedicated air flow passage is not required and accordingly the system cost can be reduced.

Figure 9:
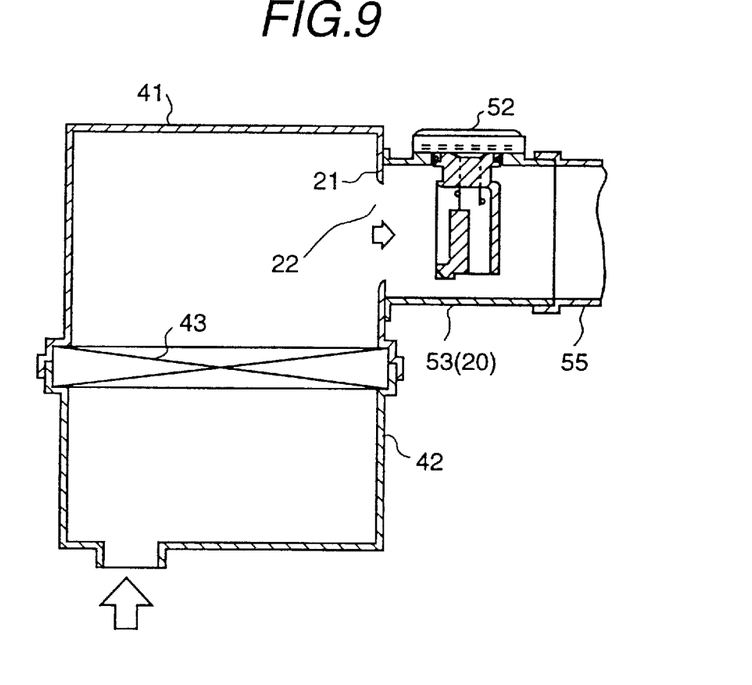
FIG. 9 is a cross-sectional view showing a further embodiment of a heating resistor type air flow meter in accordance with the present invention.
Figure 10:
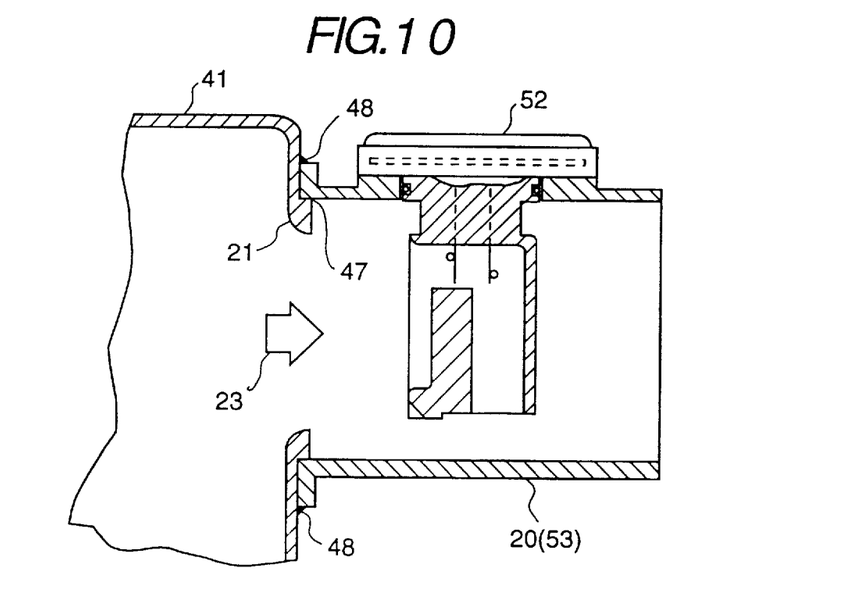
FIG. 10 is an enlarged view showing a joint portion of FIG. 9.

FIG. 9 is a cross-sectional view showing a further embodiment of a heating resistor type air flow meter in accordance with the present invention. The figure shows the flow meter in which an orifice 21 is provided in a part of an air cleaner clean side 41, and further a main air flow passage body 20 is connected to the air cleaner clean side 41. FIG. 10 is an enlarged view showing the joint portion of FIG. 9. The figure shows the details of the joint portion of a soldering portion 47 and the joint portion 48.

This embodiment is basically the same as the embodiment of FIG. 8, but the outlet opening portion of the intake air outlet portion of the air cleaner 68 is formed in a bell-mouth shaped orifice 21, and a body 53 of the main air flow passage body 20 of the flow meter is mechanically connected to the downstream side by bonding or screw fastening in the soldering portion 47 and the joint portion 48. That is, the orifice of the main air flow passage body composing the heating resistor type air flow meter is separated from the main air flow passage body, and the orifice is provided in the intake air outlet portion of the intake pipe structural member to be connected with the main air flow passage. In this embodiment, since the existing intake pipe structural member serves as the orifice 21, a dedicated air flow passage is not required. Further, an exiting heating resistor type air flow meter without orifice can be used. Accordingly, the system cost can be reduced.

Figure 11:
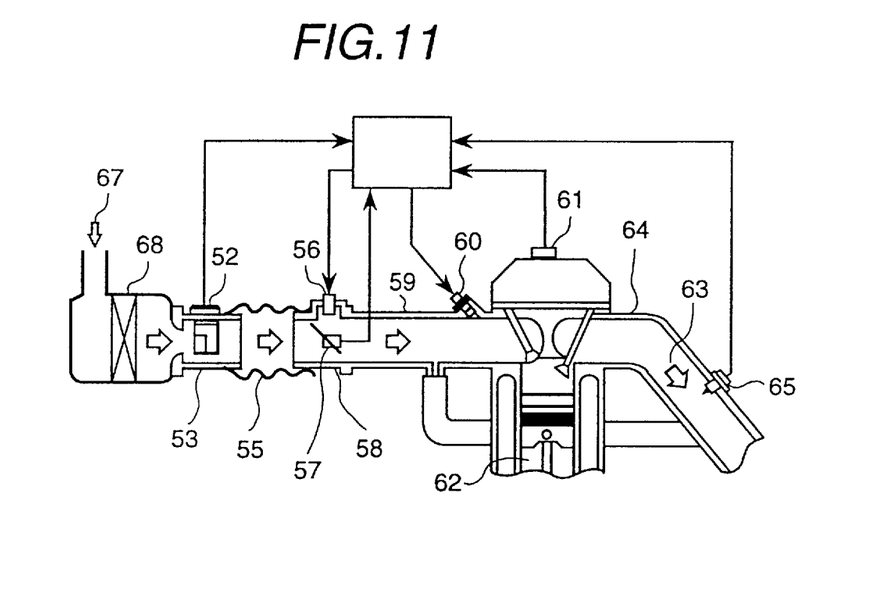
FIG. 11 is a view showing an embodiment of an internal combustion engine of an electronic fuel injection control type mounting a flow meter in accordance with the present invention.

FIG. 11 is a view showing an embodiment of an internal combustion engine of an electronic fuel injection control type mounting a flow meter in accordance with the present invention. The figure shows an embodiment of a fuel control engine for controlling a fuel supplying rate using an air flow rate signal obtained from a heating resistor type air flow meter of the present embodiment.

Referring to the figure, intake air 67 to be sucked is taken in an engine cylinder 62 through an intake system composed of an air cleaner 67, a body 53 of the flow meter, a duct 55, a throttle body 58, an intake manifold 59 having an injector 60 to which fuel is supplied and so on. On the other hand, exhaust gas generated in the engine cylinder 62 is exhausted through an exhaust manifold 64.

A control unit 66 receives an airflow rate signal output from a measuring module 52 of the flow meter, a throttle valve angle signal output from a throttle valve angle sensor 57, an oxygen concentration signal output from an oxygen concentration meter 65 provided in the exhaust manifold 64, an engine rotating speed signal output from an engine rotating speed meter 61 and so on. The control unit 66 sequentially calculates these signals to obtain an optimum fuel injecting rate and an optimum idling air control valve opening degree, and controls the injector 60 and the idle air control valve 56 using the obtained values so as to supply a flow rate of fuel matching with an intake air flow rate.

Since an intake air flow rate can be appropriately measured in the internal combustion engine of an electronic fuel injection control type mounting the flow meter in accordance with the present invention, the electronic fuel injection control can be properly performed and consequently an amount of unburned fuel gas in the exhaust gas can be reduced.

According to the present invention, increase of flow speed in the flow flux zone formed by the orifice of a simple structure reduces the jump-up error under pulsating flow accompanying back flow when a heating resistor type flow meter is mounted on a vehicle and the bad effect of the binary-value phenomena, and thereby a low-cost and highly accurate heating resistor type flow meter can be provided.

Further, appropriate fuel control can be performed when a driver steps on the accelerator, and therefore there is an effect in cleaning of exhaust gas of an internal combustion engine of an electronic fuel injection type.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A heating resistor type flow meter, comprising a main air flow passage body forming a main air flow passage for allowing a measurable fluid to flow therethrough; and a measuring module having a heating resistor for measuring a flow rate of said fluid to be measured, said measuring module arranged inside said main air flow passage body, wherein said measuring module comprises said heating resistor inside an auxiliary air flow passage body forming an auxiliary air flow passage having at least one bent portion and an inlet opening portion opening in a direction substantially perpendicular to a main flow line of said fluid to be measured and an outlet opening portion opening in a direction substantially parallel to said main flow line;

said main air flow passage body comprising an orifice on a periphery of the inner side wall positioned upstream of said air flow passage body;

both said inlet opening portion and said outlet opening portion being arranged within a flow flux zone formed by an imaginary extension of said measured fluid from a top edge of said orifice in a direction parallel to said main flow line.

2. The heating resistor type air flow meter according to claim 1, wherein a dimension of said orifice is set so that an effective cross-sectional area ratio of said orifice to an effective cross-sectional area of said main air flow passage at a position of said orifice is within a range of about 70~90%.

3. The heating resistor type air flow meter according to claim 1, wherein said orifice is formed such that an upstream side half of said orifice is approximately arc-shaped and a direction of a wall surface in the downstream side half is nearly normal to the direction of said main flow line.

4. An intake pipe structural member comprising a main air flow passage body having a main air flow passage and a hole adapted to have a measuring module inserted therethrough composing a heating resistor type air flow meter said measuring module comprising said heating resistor inside an auxiliary air flow passage body to form an L-shaped auxiliary air flow passage having an inlet opening portion opening direction perpendicular to a main flow line of a fluid to be measured and an outlet opening portion opening in a direction parallel to said main flow line, said intake pipe structural member constituting as said main air flow passage, and an orifice being provided on a periphery of an inner side wall of said main air flow passage body upstream of said auxiliary air flow passage body.

5. An intake pipe structural member comprising an orifice of a main air flow passage body at an intake air outlet position of said intake pipe structural member, said main air flow passage body containing a heating resistor type air flow meter comprising a main air flow passage body forming a main air flow passage for allowing a measurable fluid to flow therethrough; and a measuring module having a heating resistor for measuring a flow rate of said fluid to be measured, said measuring module arranged inside said main air flow passage body, wherein said measuring module comprises said heating resistor inside an auxiliary air flow passage body forming an L-shaped auxiliary air flow passage having an inlet opening portion opening in a direction perpendicular to a main flow line of said fluid to be measured and an outlet opening portion opening in a direction parallel to said main flow line;

said main air flow passage body comprising an orifice on a periphery of an inner side wall thereof positioned upstream of said auxiliary air flow passage body;

both said inlet opening portion and said outlet opening portion being arranged within a flow flux zone formed by an imaginary extension of said measured fluid from a top edge of said orifice in a direction parallel to said main flow line, said orifice being separated from said auxiliary air flow passage body.

6. A fuel control system of an internal combustion engine for controlling a fuel supply rate using an air flow rate signal obtained from the heating resistor type air flow meter comprising a main air flow passage body forming a main air flow passage for allowing a measurable fluid to flow therethrough; and a measuring module having a heating resistor for measuring a flow rate of said fluid to be measured, said measuring module arranged inside said main air flow passage body, wherein said measuring module comprises said heating resistor inside an auxiliary air flow passage body forming an L-shaped auxiliary air flow passage having an inlet opening portion opening in a direction perpendicular to a main flow line of said fluid to be measured and an outlet opening portion opening in a direction parallel to said main flow line;

said main air flow passage body comprising an orifice on a periphery of an inner side wall thereof positioned upstream of said auxiliary air flow passage body;

both said inlet opening portion and said outlet opening portion being arranged within a flow flux zone formed by an imaginary extension of said measured fluid from a top edge of said orifice in a direction parallel to said main flow line.

* * * * *